United States Patent Office 3,454,644
Patented July 8, 1969

---

3,454,644
HOMOGENEOUS HYDROGENATION PROCESS EMPLOYING A COMPLEX OF RUTHENIUM OR OSMIUM AS CATALYST
Kenneth C. Dewhirst, San Pablo, Calif., assignor to Shell Oil Company, New York, N.Y., a corporation of Delaware
No Drawing. Filed May 9, 1966, Ser. No. 548,437
Int. Cl. C07c *5/04, 5/14, 5/08*
U.S. Cl. 260—570.9                        4 Claims

ABSTRACT OF THE DISCLOSURE

A homogeneous hydrogenation process of an unsaturated organic compound of from 2 to 20 carbon atoms having as hydrogenatable unsaturation at least one moiety selected from keto, formyl, nitrile, nonaromatic carbon double bond and carbon-carbon triple bond employs as a catalyst a composition comprising a metal complex of ruthenium or osmium bonded to two electronegative species, selected from hydrogen and halogen, and complexed with at least two organic stabilizing ligands, such as carbonyl or a tertiary phosphine ligand; the catalyst is employed optionally with an excess of tertiary phosphine.

---

This invention relates to an improved process for the hydrogenation of unsaturated organic compounds, and to novel catalysts employed therein.

The hydrogenation of unsaturated organic compounds by contact with molecular hydrogen in the presence of a hydrogenation catalyst has been extensively investigated. Broadly speaking, such processes are classifiable into two general categories depending upon the physical phase in which the catalyst is present during the hydrogenation process. In one process type, herein referred to as a heterogeneous hydrogenation process, the catalyst is essentially insoluble in the reaction medium. Typical heterogenenous catalysts include transition metals, e.g., nickel, cobalt, platinum, palladium and the like, as well as the oxides thereof, e.g., platinum oxide and palladium oxide, or mixed oxide catalysts such as copper chromite. Heterogeneous hydrogenation catalysts are customarily employed as pure materials in a finely divided state or are alternatively employed supported on inert carriers. Certain difficulties are inherent in heterogeneous catalysis. Among these are problems of maintaining contact between reactants and catalyst in the multiphase reaction system and maintaining catalyst activity in view of the known tendency for the surface of heterogeneous catalysts to become "poisoned" by irreversible adsorption of reactant molecules or impurities in the reaction system, particularly low molecular weight sulfur-containing impurities.

These difficulties are largely overcome by utilization of a homogeneous hydrogenation catalyst, that is, a catalyst which is essentially completely soluble in the reaction medium. Substantially less is known about the formation or operation of homogeneous catalysts. In general, these catalysts are prepared in situ by reduction of a transition metal salt, e.g., an iron or cobalt salt, with an aluminum alkyl or similar reducing agent. Such homogeneous catalysts are characterized by instability and short catalyst life, and are neither isolable nor suitable for storage and subsequent use. In addition, the requirement for in situ formation of catalyst through the use of a reducing agent adds to the process handling difficulty and increases the process cost.

The co-pending U.S. application of K. C. Dewhirst, Ser. No. 417,482 filed Dec. 10, 1964, discloses a highly efficient homogeneous hydrogenation catalyst composition comprising certain rhodium complexes employed in conjunction with an excess of a tertiary phosphine or arsine. Such compositions are effective catalysts for the hydrogenation of nonaromatic carbon-carbon unsaturation but are ineffective for hydrogenation of other types of unsaturation.

It would be of advantage to provide an improved homogeneous hydrogenation catalyst useful in a wider variety of homogeneous hydrogenation applications and this is an object of the present invention. More particularly, it is an object to provide a process for increasing the hydrogen content of certain types of organic unsaturated molecules which incorporate unsaturation between two atoms one of which is carbon and the other of which is carbon, nitrogen or oxygen, by hydrogenating the unsaturate in the presence of certain homogeneous hydrogenation catalysts. An additional object is to provide certain novel homogeneous hydrogenation catalysts.

It has now been found that these objects are accomplished by providing certain catalyst complexes comprising ruthenium or osmium compounds and organic complexing ligands and the process of contacting organic unsaturates with molecular hydrogen in the presence of such a catalyst complex. The process of the invention is well suited for catalyzing the hydrogenation of a wide variety of organic unsaturates and exhibits utility in applications wherein prior homogeneous catalysts have not been suitable.

The metal complex catalyst comprises a ruthenium or osmium moiety bonded to two electronegative species and complexed with at least two organic complexing ligands. Without wishing to be bound by any specific theory, it is considered likely that the metal complex undergoes chemical changes during its participation in the hydrogenation process so that no one simple formula describes all active catalytic species. In one modification, the catalyst is provided in a form represented by the formula $$L_nMX_2$$

wherein L is a complexing ligand as will be defined more fully hereinbelow, $n$ is a whole number from 3 to 4 inclusive, M is a Group VIII–A metal of atomic number from 44 to 76 inclusive, i.e., ruthenium or osmium, and X is halogen. Although a number of methods are available for calculating the oxidation state of the metal, it is herein considered that the metal complex is a metal (II) complex. Under the conditions wherein the catalyst is utilized, e.g., in contact with molecular hydrogen, it is likely that the halogen substituents of the above-depicted complex are replaced, wholly or in part, by hydride substituents thereby forming hydride complexes of the formulas $$L_nMH_2 \text{ or } L_nMHX$$

wherein L, $n$, M and X have the previously stated significance. In any event, introduction of the catalyst in the form of the dihydrido complex or the halohydrido complex enables efficient hydrogenation to be conducted.

It is therefore apparent that a number of ruthenium or osmium complexes are utilizable as catalyst or catalyst precursor. These complexes are generically classified as ruthenium or osmium complexes of from 3 to 4 molecules of stabilizing ligand as will be defined below for each atom of Group VIII–A metal and two electronegative substituents bonded to the Group VIII–A metal, which substituents independently are selected from halogen and hydrogen. One class of such complexes is represented by the formula $$L_nMZ_2$$

wherein L, $n$ and M have the previously stated significance and Z independently is hydrogen or halogen, preferably halogen of atomic number from 17 to 35 inclusive, i.e., the middle halogens chlorine or bromine.

The term L in the above formulas represents an organic stabilizing ligand employed in the Group VIII–A metal complex. Although organic ligands such as olefin, phenol, thiophenol and the like are in part operable, best results are obtained when the complexing ligand is a carbonyl ligand, i.e., a CO ligand, or is a teritary phosphine ligand. By the term "tertiary phosphine" is meant a trisorgano derivative of phosphorus characterized in that each valence of the phosphorus is satisfied by direct bonding to a carbon atom of an organic moiety. One class of tertiary phosphines is represented by the formula $$RRRP$$

wherein R independently is an organic moiety of up to 20 carbon atoms, preferably up to 10, which is free from active hydrogen atoms and reactive unsaturated moieties. Preferred R groups are saturated aliphatic, saturated cycloaliphatic or aromatic in character and are hydrocarbyl, i.e., contain only atoms of carbon and hydrogen, or are non-hydrocarbyl containing atoms other than carbon and hydrogen in functional groups free from active hydrogen atoms and reactive unsaturation such as halo, alkoxy and dialkylamino.

Illustrative of suitable aliphatic and cycloaliphatic groups are alkyl and cycloalkyl groups such as methyl, ethyl, propyl, sec-butyl, isooctyl, decyl, lauryl, cyclohexyl, cyclopentyl, 3,4-dimethylcyclohexyl, and cyclooctyl as well as non-hydrocarbyl groups such as 4-bromohexyl, methoxymethyl, 3-dimethylaminopropyl and 3-chlorobutyl. Aromatic R groups are those wherein the phosphorus atom of the phosphine ligand is bound directly to the carbon atom of an aromatic ring and include hydrocarbon aromatic groups, e.g., aryl and alkaryl groups, such as phenyl, naphthyl, tolyl, xylyl, p-ethylphenyl, m-benzylphenyl, and p-tert-butylphenyl, as well as non-hydrocarbyl groups including p-chlorophenyl, p-methoxyphenyl, 2,4-dibromophenyl, p-dimethylaminophenyl and 2-chloro-3-hexylphenyl. Also suitable are groups incorporating an aromatic moiety but wherein the linking valence to the phosphorus of the tertiary phosphine is that of an aliphatic carbon atom, i.e., aralkyl and substituted aralkyl groups such as benzyl, 2-phenylethyl, 5-(p-chlorophenyl)octyl and 4-phenylhexyl.

A preferred class of R groups comprises hydrocarbyl or halohydrocarbyl groups of up to 2 halogen substituents which are halogen of atomic number from 17 to 35 inclusive. This class is generically designated (halo)-hydrocarbon of up to 2 halogen substituents. In most applications, however, hydrocarbyl groups are preferred over analogous halohydrocarbyl groups and particularly preferred as at least one R group of the tertiary phosphine is phenyl.

In the RRRP ligand as previously defined the R moieties are the same or are different. Exemplary tertiary phosphine ligands include triethylphosphine, triphenylphosphine, tris(4-methoxyphenyl)phosphine, phenyldimethylphosphine, diphenylmethylphosphine, dimethyllaurylphosphine and tris(2-chlorophenyl)phosphine.

In the above formula representations of the Group VIII–A metal complexes, e.g., $$L_nMZ_2$$

wherein L, $n$, M and Z have the previously stated significance, L independently is preferably carbonyl or tertiary phosphine. Best results are obtained, however, when at least one and preferably at least two of the L ligands are tertiary phosphine. These complexes are prepared by several methods. A general procedure is provided by Chatt, J. Chem. Soc., 896 (1961), 3466 (1964). Other procedures include reacting a complex wherein each L is tertiary phosphine with carbon monoxide to replace one or more tertiary phosphine ligands with carbonyl ligands. In yet another preparation, the metal complex is prepared in situ by ligand exchange in the hydrogenation medium. This procedure comprises the addition to the reaction medium of a readily prepared Group VIII–A metal complex and an excess of a ligand whose introduction into the complex is desired. For example, addition of dihydridotetrakis(methyldiphenylphosphine)ruthenium (II) and excess triphenylphosphine to the hydrogenation process reaction medium forms in situ a catalyst complex which operates at least in part in the manner of a dihydridotetrakis(triphenylphosphine)ruthenium(II) complex.

It is useful, on occasion, to employ the Group VIII–A metal complex catalyst in conjunction with an excess of tertiary phosphine complexing ligand which is the same tertiary phosphine ligand present in the original metal catalyst or alternatively is a different member of the class of tertiary phosphines. The role of the excess tertiary phosphine is not understood with certainty but in some applications the presence of excess phosphine ligand appears to alter the stability of the metal complex catalyst thereby providing more rapid rates of hydrogenation and/or increased catalyst life. As previously stated, excess phosphine is not required but when excess phosphine is employed a molar ratio of excess tertiary phosphine to Group VIII–A metal complex up to about 150:1 is satisfactory with a molar ratio of up to about 100:1 being preferred.

The improved hydrogenation process comprises utilization of the Group VIII–A metal complexes to catalyze the hydrogenation of unsaturated organic molecules by contact of the unsaturate with molecular hydrogen. The advantage to be gained by the use of the process resides broadly in the efficient catalysis of hydrogenation of certain types of unsaturation rather than in the hydrogenation of particular organic compounds as the process is applicable to the hydrogenation of a number of types of unsaturated molecules. In general, however, the unsaturated molecules employed have from 2 to 20 carbon atoms and from 1 to 4 unsaturated moieties which are hydrogenatable under the conditions employed. The process is applicable to the homogeneous hydrogenation of functional groups comprising non-aromatic unsaturation between two atoms one of which is carbon and the other of which is an atom of atomic number from 6 to 8 inclusive, e.g., the other atom is carbon, nitrogen or oxygen. Preferred functional groups of this class are keto, formyl, nitrile and imino as well as non-aromatic carbon-carbon unsaturation such as non-aromatic carbon-carbon double bonds and carbon-carbon triple bonds. It is a feature of the process that such unsaturated moieties are efficiently hydrogenated to corresponding species with increased hydrogen content, i.e., corresponding reduced species, without observable reduction of other unsaturated groups such as carboxy, carboalkoxy, sulfonyl, aryl ring systems and the like.

Illustrative of suitable substrates incorporating at least one functional group comprising non-aromatic unsaturation between carbon and carbon, nitrogen or oxygen are hydrocarbons such as ethylene, propylene, hexene, dodecene, cyclopentene, cyclooctadiene, propenylbenzene,, biallyl, trivinylbenzene, divinylcyclobutane, butadiene, isoprene, vinylcyclohexene, 2,6,8-octadecatriene, acetylene hexyne and decyne; nitriles including propionitrile, acrylonitrile 2-methyleneglutaronitrile, methacrylonitrile and adiponitrile; keto and formyl compounds such as methyl vinyl ketone, methyl isobutyl ketone, crotonaldehyde, cinnamic aldehyde and acrolein; unsaturated sulfones such as methyl vinyl sulfone, phenyl butadienyl sulfone and sulfolene; and unsaturated amides such as N,N-dimethylacrylamide.

The process is also applicable to the hydrogenation of polymeric materials which contain regularly occurring or occasional unsaturated linkages. Illustration of such polymeric materials are those polymers prepared by 1,4-polymerization of butadiene or isoprene with a variety of other monomers, which polymers contain divalent 2-butenyl moieties. Hydrogenation of such polymeric materials according to the process of the invention results in the effective conversion of the butenyl moieties to butyl moieties, thereby modifying the properties of the polymer. In like manner, other polymers containing carbon-carbon unsaturation are converted to the corresponding saturated derivative by the process of the invention.

The preferred type of unsaturated moiety comprises non-aromatic carbon-carbon unsaturation, particularly ethylenic unsaturation, as this type of unsaturation is most easily hydrogenated under moderate conditions.

The Group VIII–A metal complex is employed in catalytic quantities. Amounts of the catalyst from about 0.0001% mole to about 1% mole based on the material to be hydrogenated are satisfactory although amounts from about 0.001% mole to about 0.1% mole on the same basis are preferred.

The hydrogenation process is typically conducted in liquid-phase solution in the presence or the absence of an inert solvent that is nonhydrogenatable under the conditions of the reaction. Illustrative solvents include hydrocarbons free from non-aromatic unsaturation such as benzene, toluene, xylene, cumene, isooctane, cyclohexane and methylcyclopentane; sulfones such as sulfolane, diethyl sulfone and methyl butyl sulfone; ethers including dialkyl ethers such as diethyl ether, dibutyl ether and propyl hexyl ether, lower alkyl ethers (full) of polyhydric alcohols and poly(oxyalkylene)glycols such as dimethoxyethane, glycerol triethyl ether, diethylene glycol dimethyl ether and tetraethylene glycol diethyl ether; alcohols including lower alkanols such as ethanol, isopropanol, sec-butanol and hexanol, fluoroalcohols such as 2,2,2-trifluoroethanol and bis(trifluoromethyl) phenyl carbinol, and ether-alcohols, e.g., 2-ethoxyethanol and diethylene glycol monomethyl ether; and phenols including phenol, p-chlorophenol, m-ethylphenol and m-bromophenol. It is, of course, within the contemplated scope of the process of the invention to employ no reaction solvent as when the catalyst composition is soluble in the unsaturated organic reactant.

The hydrogenation process is typically conducted by mixing the material to be hydrogenated, the solvent if any, the catalyst complex and any excess stabilizing ligand in an autoclave or similar pressure vessel and pressurizing the reactor with hydrogen. The method of mixing is not material. One reaction component may be added to the others in increments, although it is equivalently useful to initially mix the entire amounts of reaction mixture components. The hydrogenation process is conducted at convenient temperatures and at an atmospheric or superatmospheric pressure of hydrogen. Suitable reaction temperatures vary from about 0° C. to about 200° C., the optimum temperature depending in part upon the particular catalyst complex and unsaturated organic material employed. Best results are obtained when the reaction temperature is from about 20° C. to about 130° C. Hydrogen pressures from about 1 atmosphere to about 200 atmospheres are generally satisfactory and the reaction pressure range from about 10 atmospheres to about 100 atmospheres of hydrogen is preferred.

Subsequent to reaction, the product mixture is separated and the desired product is recovered by conventional means such as fractional distillation, selective extraction, crystallization, chromatographic techniques and the like.

The products of the hydrogenation process are organic compounds wherein the hydrogenatable unsaturated linkages present in the reactant molecule have been saturated by the addition of a molecule of hydrogen thereto. Illustrative hydrogenation products include propylamine produced by hydrogenation of acrylonitrile, propyl alcohol produced by hydrogenation of propionaldehyde, n-hexane produced by hydrogenation of 1-hexene and sulfolane produced by the hydrogenation of sulfolene. As previously stated, the process of the invention is characterized by efficient reduction of certain types of non-aromatic carbon-carbon, carbon-oxygen or carbon-nitrogen unsaturation with little or no tendency toward hydrogenation of other types of unsaturation present in the reactant molecule.

To further illustrate the improved method of hydrogenation and the novel catalyst compositions employed therein, the following examples are provided.

EXAMPLE I

The ruthenium salt tri-$\mu$-chlorohexakis(diphenylmethylphosphine)diruthenium(II) chloride was prepared by the general procedure of the above Chatt references. This salt, having the formula

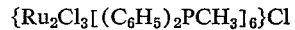

is considered to be an ionic dimer of the complex dichlorotris(diphenylmethylphosphine)ruthenium(II). In a mixture of 5 ml. of benzene and 5 ml. of ethanol, 0.5 g. of this salt was dissolved and the resulting solution was transferred to a pressure vessel and purged with nitrogen. To the solution was added 2.0 ml. of anhydrous hydrazine and the vessel was pressurized with hydrogen to 600 p.s.i.g. and heated at 80° C. for 0.5 hour. In a nitrogen atmosphere, the product mixture was cooled, concentrated and then diluted with ethanol to give 300 mg. of dihydridotetrakis(diphenylmethylphosphine)ruthenium (II), a yellow solid, which decomposed at 190° C. after recrystallization from a benzene-ethanol mixture. The product, believed to be a novel compound, had the following elemental analysis.

*Analysis.*—Calc., percent wt.: C, 69.2; H, 6.0; Ru, 11.2. Found: C, 69.9; H, 6.3; Ru, 11.0

The infrared and nuclear magnetic resonance spectra of the product were consistent with the above structure.

EXAMPLE II

A 500 mg. quantity of dihydridotetrakis(diphenylmethylphosphine)ruthenium(II), prepared by the procedure of Example I, was dissolved in 10 ml. of benzene, contacted with a 200 p.s.i.g. pressure of carbon monoxide and heated at 86° C. for 1 hour. The reaction mixture was cooled, concentrated and diluted with ethanol to give white crystals of dihydridocarbonyltris(diphenylmethylphosphine)ruthenium(II), M.P. 170–172° C. The product, believed to be a novel compound, had the following elemental analysis.

*Analysis.*—Calc.: C, 65.6% wt; H, 5.7% wt; mol. wt., 731. Found: C, 65.7% wt.; H, 5.6% wt.; mol. wt., 810.

The infrared and nuclear magnetic resonance spectra were consistent with the above formula.

EXAMPLE III

In 50 ml. of methanol, 1.0 g. of ruthenium trichloride trihydrate was dissolved and 10 g. of triphenylphosphine was added. The resulting mixture was refluxed overnight, filtered, and the residue was washed with hot methanol and hexane to give 3 g. of a brown product, dichlorotris- (triphenylphosphine)ruthenium(II) which had the following elemental analysis.

*Analysis.*—Calc. percent wt.: C, 67.7; H, 4.7; Cl, 7.4. Found: C, 68.5; H, 5.5; Cl, 7.5.

EXAMPLE IV

A series of hydrogenations was conducted wherein 1-hexene was hydrogenated under various reaction conditions. A 10 ml. quantity of the hexene, catalyst complex and excess phosphine, if any, were dissolved in 20 ml. of solvent in an 80 ml. magnetically-stirred autoclave and pressurized to 600 p.s.i.g. with nitrogen. Each reaction mixture was maintained at the indicated reaction temperature for the indicated time, after which the vessel was cooled and the product mixture analyzed by gas-liquid chromatography.

(A) In this run, 10 mg. of dichlorotris(triphenylphosphine)ruthenium(II) was employed as catalyst in conjunction with 100 mg. of excess triphenylphosphine. The solvent employed was 20 ml. of methanol and the reaction temperature was 54° C. At the conclusion of a reaction period of 2 hours, 95% of the 1-hexene had been converted to n-hexane.

(B) In this run 10 mg. of dihydridotetrakis(diphenylmethylphosphine)ruthenium(II) was employed as catalyst. The reaction solvent was m-cresol and the reaction temperature was 30° C. At the conclusion of a 2.5 hour reaction period, 95% of the 1-hexene had been converted to n-hexane.

(C) In this run, the catalyst was tri-$\mu$-chlorohexakis(diphenylmethylphosphine)diosmium(II) chloride employed in conjunction with 250 mg. of triphenylphosphine and the solvent was 20 ml. of m-cresol. The rate of 1-hexene hydrogenation was determined by measuring the hydrogen pressure decrease as a function of time. At 176° C. the rate of hydrogen pressure decrease was 20 p.s.i./hr. At a catalyst level of 50 mg. of the osmium complex per gram of triphenylphosphine, the rate of pressure decrease was 355 p.s.i./hr. at 125° C.

EXAMPLE V

A series of runs was made according to the procedure of Example IV wherein 10 ml. of 2-hexene was employed as the unsaturate.

(A) In this run, 10 mg. of dichlorotris(triphenylphosphine)ruthenium(II) was employed as catalyst and 100 mg. of excess triphenylphosphine was added. The reaction solvent was 20 ml. of toluene and the reaction temperature was 100° C. At the conclusion of a 3.5 hour reaction period, 94% of the 2-hexene had been converted and the selectivity to n-hexane was quantitative.

(B) In this run, 10 mg. of chlorohydridotris(triphenylphosphine)carbonylruthenium(II) was employed as catalyst in conjunction with 100 mg. of excess triphenylphosphine. The reaction solvent was 20 ml. of toluene and the reaction temperature was 130° C. At the conclusion of a 16 hour reaction period, the yield of n-hexane was quantitative.

EXAMPLE VI

By a procedure similar to that of Example IV, 10 ml. of mesityl oxide was hydrogenated in 20 ml. of 2,2,2-trifluoroethanol employing 30 mg. of dichlorotris(triphenylphosphine)ruthenium(II) as catalyst. The hydrogenation was allowed to proceed overnight at 24° C. and at the conclusion of this time the conversion to methyl isobutyl ketone was quantitative.

A more rapid rate of hydrogenation was observed when p-chlorophenol was employed as solvent and the hydrogenation was conducted at 124° C.

EXAMPLE VII

To 20 ml. of ethanol was added 10 ml. of methyl isobutyl ketone, 200 mg. of triphenyl phosphine and 100 mg. of dichlorotris(triphenylphosphine)ruthenium(II). The mixture was maintained at 160° C. for 16 hours with an initial hydrogen pressure of 600 p.s.i.g. At the conclusion of the reaction period, the yield of methyl isobutyl carbinol was quantitative.

Similar results were obtained when an equivalent amount of dichlorotris(phenyldiethylphosphine)carbonylruthenium(II) or chlorohydridotris(triphenylphosphine)carbonylruthenium(II) was employed as the catalyst.

When the above procedure was attempted employing 100 mg. of chlorotris(triphenylphosphine)rhodium(I) and 1.0 g. of excess triphenylphosphine as the catalyst system, no hydrogenation of the methyl isobutyl ketone was observed at temperatures as high as 200° C.

EXAMPLE VIII

By a procedure similar to that of Example IV, 10 ml. of propionaldehyde was dissolved in 20 ml. of ethanol and 100 mg. of dichlorotris(triphenylphosphine)ruthenium(II) and 200 mg. of triphenylphosphine were added. The reaction temperature was 100° C. and the initial hydrogen pressure was 600 p.s.i.g. At the conclusion of about 0.5 hour, the yield of propanol was 93%.

Similar results were obtained when the ethanol solvent of the above example was replaced with an equal volume of either toluene or m-cresol.

EXAMPLE IX

To a reactor was charged 1.0 g. of dichlorotris(triphenylphosphine)ruthenium(II), 1.0 g. of triphenylphosphine, 10 ml. of benzonitrile and 20 ml. of ethanol. The reactor was pressurized to 600 p.s.i.g. with hydrogen and maintained overnight at 130° C. At the conclusion of this time, 85% of the theoretical amount of hydrogen had been absorbed. Fractional distillation of the product mixture afforded a 29% yield of benzylamine, identified as its p-toluenesulfonamide.

EXAMPLE X

To a reactor was charged 100 mg. of dichlorotris(triphenylphosphine)ruthenium(II), 200 mg. of triphenylphosphine, 10 ml. of acetophenone and 20 ml. of ethanol. The reactor was pressurized to 600 p.s.i.g. with hydrogen and maintained at 160° C. for 8 hours. Fractional distillation of the product mixture afforded a 72% yield of methyl phenyl carbinol, identified by a comparison of the infrared spectrum thereof with that of an authentic sample.

I claim as my invention:

1. In the process of homogeneously hydrogenating an unsaturated organic compound of from 2 to 20 carbon atoms having as hydrogenatable unsaturation at least one moiety selected from keto, formyl, nitrile, non-aromatic carbon-carbon double bond and carbon-carbon triple bond by contacting said unsaturated organic compound with molecular hydrogen in the presence of a homogeneous hydrogenation catalyst, the improvement which comprises employing as the homogeneous hydrogenation catalyst, in an amount from about 0.0001% mole to about 1% mole based on said unsaturated organic compound, a metal complex of the formula

$$L_nMZ_2$$

wherein $n$ is a whole number from 3 to 4 inclusive, M is ruthenium or osmium, Z independently is chlorine, bromine or hydrogen and L independently is CO or tertiary phosphine with at least three L's being tertiary phosphine, wherein said tertiary phosphine is a phosphine of the formula RRRP in which R independently is a saturated hydrocarbyl radical of up to 20 carbon atoms or said hydrocarbyl radical substituted with chloro, bromo, alkoxy or dialkylamino, in the presence of up to 150 moles per mole of said complex of tertiary phosphine, wherein tertiary phosphine is as defined hereinbefore, in the liquid phase at a temperature from about 0° C. to about 200° C. and a hydrogen pressure of from about 1 atmosphere to about 200 atmospheres.

2. The process of claim 1 wherein the metal complex is dichlorotris(triphenylphosphine)ruthenium(II).

3. The process of claim 1 wherein the metal complex is chlorohydridotris(triphenylphosphine)carbonylruthenium(II).

4. The process of claim 1 wherein the metal complex is dihydridotetrakis(diphenylmethylphosphine)ruthenium(II).

References Cited

UNITED STATES PATENTS

| | | | |
|---|---|---|---|
| 3,110,747 | 11/1963 | Mullineaux | 260—570.9 X |
| 3,130,237 | 4/1964 | Wald | 260—690 X |
| 3,152,184 | 10/1964 | Levering | 260—570.9 |
| 3,270,087 | 8/1966 | Heck | 260—683.9 |
| 3,324,018 | 6/1967 | Fotis | 260—683.9 X |
| 3,366,646 | 1/1968 | Dewhirst | 260—683.9 X |

CHARLES B. PARKER, *Primary Examiner.*

S. T. LAWRENCE III, *Assistant Examiner.*

U.S. Cl. X.R.

252—472; 260—96, 578, 583, 593, 599, 618, 638, 666, 668, 683.9, 690